US008719823B2

(12) United States Patent
Subrahmanyam et al.

(10) Patent No.: US 8,719,823 B2
(45) Date of Patent: May 6, 2014

(54) MANAGING LATENCY INTRODUCED BY VIRTUALIZATION

(75) Inventors: Pratap Subrahmanyam, Saratoga, CA (US); Carl A. Waldspurger, Palo Alto, CA (US); Vyacheslav Malyugin, Los Gatos, CA (US); Tal Garfinkel, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 1175 days.

(21) Appl. No.: 12/397,914

(22) Filed: Mar. 4, 2009

(65) Prior Publication Data

US 2010/0229173 A1 Sep. 9, 2010

(51) Int. Cl.
*G06F 9/455* (2006.01)
*G06F 9/46* (2006.01)

(52) U.S. Cl.
USPC .............................. 718/101; 718/1

(58) Field of Classification Search
USPC ...................................... 718/1, 101
See application file for complete search history.

(56) References Cited

U.S. PATENT DOCUMENTS

| 7,065,762 | B1 | 6/2006 | Duda | |
|---|---|---|---|---|
| 7,181,741 | B2* | 2/2007 | Sangili | 718/1 |
| 7,617,411 | B2* | 11/2009 | Baba et al. | 714/4.1 |
| 8,074,115 | B2* | 12/2011 | Stolfo et al. | 714/38.1 |
| 8,135,994 | B2* | 3/2012 | Keromytis et al. | 714/38.11 |
| 8,151,032 | B2* | 4/2012 | Oshins | 711/6 |
| 8,151,277 | B2* | 4/2012 | Greifeneder et al. | 719/317 |
| 8,230,155 | B2* | 7/2012 | Oshins | 711/6 |
| 8,239,939 | B2* | 8/2012 | Dunagan et al. | 726/22 |
| 2005/0108711 | A1* | 5/2005 | Arnold et al. | 718/100 |
| 2006/0248528 | A1* | 11/2006 | Oney et al. | 718/1 |
| 2008/0163211 | A1 | 7/2008 | Mizuno | |
| 2009/0055571 | A1* | 2/2009 | Budko et al. | 711/6 |
| 2009/0083736 | A1* | 3/2009 | Goto | 718/1 |
| 2009/0150884 | A1* | 6/2009 | Fukuda | 718/1 |
| 2010/0162052 | A1* | 6/2010 | Shimogawa | 714/48 |

FOREIGN PATENT DOCUMENTS

| EP | 1531390 A2 * | 5/2005 |
|---|---|---|
| WO | 0013357 A1 | 3/2000 |

OTHER PUBLICATIONS

Dongsung Kim et al. "Guest-Aware Priority-Based Virtual Machine Scheduling for Highly Consolidated Server", LNCS 5168, Aug. 2008, pp. 285-294, ISSN 0 302-9743.

"Notification of Transmittal of the International Search Report and the Written Opinion of the International Searching Authority, or the Declaration", Korean Intellectual Property Office, Mailed Jul. 30, 2010.

European Patent Office, Supplementary European Search Report, dated Jan. 7, 2013, pp. 1-6.

* cited by examiner

*Primary Examiner* — Aimee Li

(57) ABSTRACT

A component manages and minimizes latency introduced by virtualization. The virtualization component determines that a currently scheduled guest process has executed functionality responsive to which the virtualization component is to execute a virtualization based operation, wherein the virtualization based operation is one that is not visible to the guest operating system. The virtualization component causes the guest operating system to de-schedule the currently scheduled guest process and schedule at least one separate guest process. The virtualization component then executes the virtualization based operation concurrently with the execution of the at least one separate guest process. Responsive to completing the execution of the virtualization based operation, the virtualization component causes the guest operating system to re-schedule the de-scheduled guest process.

34 Claims, 3 Drawing Sheets

MANAGING LATENCY INTRODUCED BY VIRTUALIZATION

TECHNICAL FIELD

One or more embodiments of this invention pertain generally to virtual computing, and more specifically to managing latency introduced by virtualization.

BACKGROUND

Virtualization technologies are becoming prevalent in the market place. At least some of these technologies provide a virtual hardware abstraction to guest operating systems, and allow them to run in virtual machines in a functionally isolated environment on a host computer. Virtualization allows one or more virtual (guest) machines to run on a single physical (host) computer, providing functional and performance isolation for processor, memory, storage, etc.

As is well known in the field of computer science, a virtual machine is an abstraction—a "virtualization"—of an actual physical computer system. FIG. 1 shows one possible arrangement of a computer system (computer system 700) that implements virtualization. As shown in FIG. 1, virtual machine or "guest" 200 is installed on a "host platform," or simply "host," which includes system hardware, that is, hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each virtual machine 200 will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the virtual machine may be implemented in software using known techniques to emulate the corresponding physical components. The guest system software includes guest operating system (OS) 220 and drivers 224 as needed for the various virtual devices 270.

Note that a single virtual machine 200 may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP virtual machines. FIG. 1, for example, illustrates multiple virtual processors 210-0, 210-1, . . . , 210-*m* (VCPU0, VCPU1, . . . , VCPUm) within virtual machine 200.

Yet another configuration is found in a so-called "multi-core" host architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another configuration that provides for simultaneous execution of multiple threads is referred to as "simultaneous multi-threading," in which more than one logical CPU (hardware thread) operates simultaneously on a single chip, but in which the logical CPUs flexibly share some resource such as caches, buffers, functional units, etc. One or more embodiments of this invention may be used regardless of the type—physical and/or logical—or number of processors included in a virtual machine.

In many cases applications 261 running on virtual machine 200 will function as they would if run on a "real" computer, even though the applications are running at least partially indirectly, that is via guest OS 220 and virtual processor(s). Executable files will be accessed by the guest OS from virtual disk 240 or virtual memory 230, which will be portions of the actual physical disk 140 or memory 130 allocated to that virtual machine. Once an application is installed within the virtual machine, the guest OS retrieves files from the virtual disk just as if the files had been stored as the result of a conventional installation of the application. The design and operation of virtual machines are well known in the field of computer science.

Some interface is generally required between the guest software within a virtual machine and the various hardware components and devices in the underlying hardware platform. This interface—which may be referred to generally as "virtualization software" or "virtualization logic"—may include one or more software and/or hardware components and/or layers, possibly including one or more of the software components known in the field of virtual machine technology as "virtual machine monitors" (VMMs), "hypervisors," or "virtualization kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" virtual machine to facilitate the operations of other virtual machines. Furthermore, specific software support for virtual machines may be included in the host OS itself. Unless otherwise indicated, one or more embodiments of the invention described herein may be used in virtualized computer systems having any type or configuration of virtualization logic.

FIG. 1 shows virtual machine monitors that appear as separate entities from other components of the virtualization software. Furthermore, some software components used to implement one or more embodiments of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that one or more embodiments of the invention can be implemented anywhere within the overall structure of the virtualization software, and even in systems that provide specific hardware support for virtualization.

The various virtualized hardware components in the virtual machine, such as virtual CPU(s) 210-0, 210-1, . . . , 210-*m*, virtual memory 230, virtual disk 240, and virtual device(s) 270, are shown as being part of virtual machine 200 for the sake of conceptual simplicity. In actuality, these "components" are usually implemented as software emulations 330 included in the VMM.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another term, which has yet to achieve a universally accepted definition, is that of "para-virtualization." As the term implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, the term para-virtualization implies that the guest OS (in particular, its kernel) is specifically designed to support such an interface. According to this view, having, for example, an off-the-shelf version of Microsoft Windows XP™ as the guest OS would not be consistent with the notion of para-virtualization. Others define the term para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, embodiments of this invention are not restricted to use in systems with any particular "degree" of virtualization and are not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM.

As illustrated in FIG. 1, in many cases, it may be beneficial to deploy VMMs on top of a software layer—kernel 600—constructed specifically to provide support for the virtual machines. This configuration is frequently referred to as being "non-hosted." Kernel 600 also handles any other applications running on it that can be separately scheduled, as well as a console operating system that, in some architectures, is used to boot the system and facilitate certain user interactions with the virtualization software.

Note that kernel 600 is not the same as the kernel that will be within guest OS 220—as is well known, every operating system has its own kernel. Note also that kernel 600 is part of the "host" platform of the virtual machine/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolving in the art of virtualization.

As will be understood by those of ordinary skill in the relevant art, while a virtual machine 200 is running, the hypervisor (or VMM, etc.) often performs a non-trivial amount of work in order to properly virtualize guest operations. In some cases, such as guest I/O operations, the system architecture and device model allow the guest to continue doing other useful work while the hypervisor processes earlier operations asynchronously. The hypervisor typically notifies the guest OS when the asynchronous operation completes, such as by posting a virtual I/O completion interrupt, emulating the behavior of hardware in a non-virtualized system.

Operating systems, including guest operating systems, are typically designed to tolerate known high-latency operations, such as device I/O, by using asynchronous techniques. For example, a process which executes a disk I/O request that must complete before further execution (e.g., a filesystem metadata write), will be de-scheduled until the I/O completes, allowing other unrelated processes to run.

Virtualization may also introduce significant delays that may or may not be detectable by a guest OS. These delays may not be anticipated by the guest OS, because the virtualization based operations that give rise to the delays may not be visible to the guest OS. For example, the hypervisor may swap out a page of guest "physical" memory to disk, in order to free up memory for other VMs. When a guest process later accesses this "physical" memory, the hypervisor must restore its contents from disk before allowing the process to continue execution. In existing systems, the hypervisor de-schedules the entire VM, or at least the VCPU that performed the access. This effectively blocks the guest from making any further progress until the swap-in completes.

To provide a specific example in more detail, when an OS is virtualized, the physical pages of the guest (GPPNs) have to be mapped to some real machine pages (MPNs) in the physical host. When the hypervisor is under memory pressure, it will typically need to reclaim an MPN from the guest, the reclaimed MPN typically being selected based on some working set algorithm (or randomly). The hypervisor then swaps the page to the hypervisor-level swap device, and allows the MPN to be used by, for example, another guest. If the first VM were then to access the GPPN, it would take a page fault in the processor, and the hypervisor would have to bring the contents back from the swap device. This process can be quite time consuming. More specifically, since the swap device is typically a mechanical device such as a disk drive, typical access latencies are several milliseconds, in which time a modern CPU can execute several million instructions. Unfortunately, the guest cannot make forward progress in the meantime, as the hypervisor and its operations are not visible to the guest. This is but one example of many circumstances under which the hypervisor performs a lengthy operation without the guest being able to schedule another process during the period of latency.

It would be desirable to allow the guest to continue performing useful work where the hypervisor is performing virtualization tasks that are not visible to the guest.

SUMMARY OF INVENTION

Virtualization logic determines that a currently scheduled guest process has executed functionality responsive to which the virtualization logic is to execute a virtualization based operation that is not visible to the guest operating system. The virtualization logic causes the guest operating system to de-schedule the currently scheduled guest process and schedule at least one separate guest process (which can but need not be the guest OS idle loop). The virtualization logic then executes the virtualization based operation concurrently with the execution of the at least one separate guest process. Responsive to completing the execution of the virtualization based operation, the virtualization logic causes the guest operating system to re-schedule the de-scheduled guest process (i.e., (1) the virtualization logic marks the process as ready to run, and (2) at some later point, the guest OS selects the process from among all runnable processes, and actually executes it).

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 2:
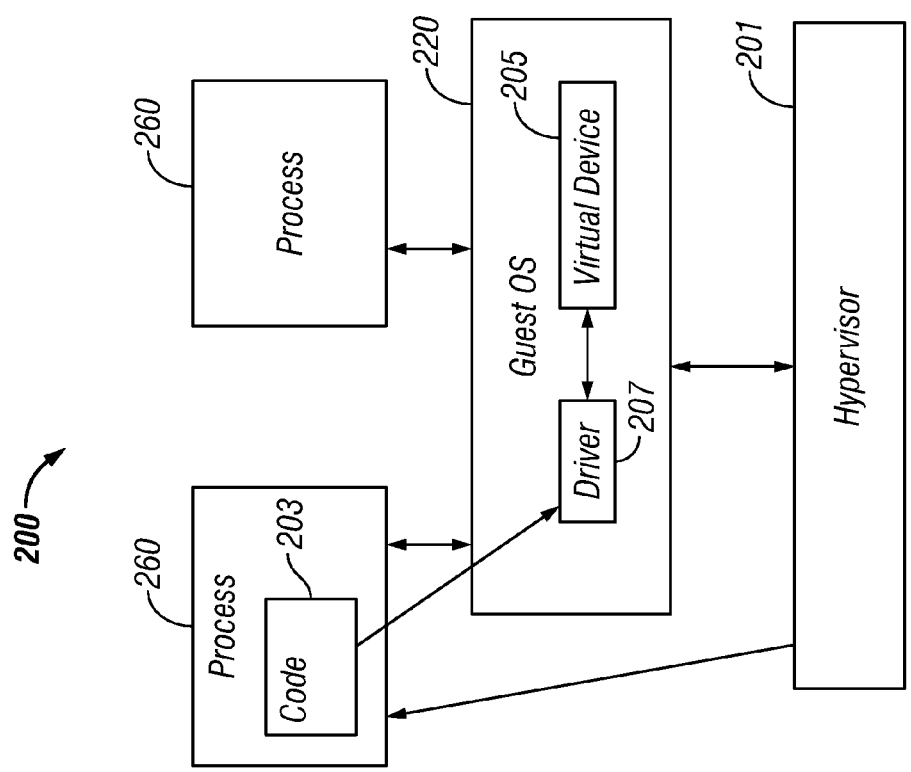
FIG. 2 is a block diagram illustrating managing latency introduced by virtualization, according to some embodiments of the present invention.

FIG. 2 illustrates a system 200 in which a hypervisor 201 (or VMM, etc.) manages latency introduced by virtualization, according to some embodiments of the present invention. It is to be understood that although various components are illustrated in FIG. 2 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

In an embodiment illustrated in FIG. 2, the hypervisor 201 uses an upcall methodology to inject code 203 into the currently scheduled guest process 260, such that when the injected code 203 is executed in the guest process 260 context, that guest process 260 blocks, causing the guest operating system 220 to schedule another process 260. The implementation mechanics of using an upcall methodology to inject code 203 into a guest process 260 are described in detail in the commonly assigned patent application titled "Transparent VMM-Assisted User-Mode Execution Control Transfer," filed on 30 Oct. 2008, now bearing Ser. No. 12/261,623, which is incorporated herein by reference in its entirety. As is explained in detail in the incorporated application, this upcall based approach involves the injection of code 203 into the guest context, such as by the guest registering one or more pages of memory that the hypervisor 201 can use for performing upcalls, or by the hypervisor 201 modifying existing guest code pages.

In one embodiment, the hypervisor 201 causes the guest operating system 220 to load a virtual device 205 (e.g., a Peripheral Component Interconnect (PCI) device), for example at boot time. Because the hypervisor 201 controls operation of the BIOS that the guest OS 220 reads, it is able to cause the guest OS 220 to perform such a load operation. The driver 207 for the virtual device 205 simply contains a small amount of code (e.g., a page) that opens the device 205, performs a trivial blocking operation (e.g., reads one byte from the device 205), and, upon return from the blocking operation, returns control to the caller. Of course, any blocking operation such as a write, ioctl, etc., can be used instead of a read.

When the currently scheduled guest process 260 triggers a long-latency emulation activity in the hypervisor 201, the hypervisor 201 performs an upcall into the guest process 260, as described above. The upcall executes guest code 203 (e.g., from a special pre-arranged guest page) that calls the driver 207. More specifically, the process 260 can execute a system call (e.g., Linux "read" or "ioctl") which is directed at the device 205 based on the file descriptor passed thereto. The system call transfers control to the guest OS 220, which invokes code in driver 207 to perform the requested blocking operation. Thus, the driver 207 is called, in effect, by the currently scheduled guest process 260. As described above, the driver 207 opens the virtual device 205, and, e.g., reads a byte from it. This read is a blocking operation, which causes the guest OS 220 to de-schedule the process 260 until the read request is satisfied. In other words, the currently-scheduled guest process 260 blocks, rather than simply remaining scheduled but not performing useful work while the hypervisor 201 performs its long-latency task. Because the guest process 260 blocks, the guest OS 220 automatically schedules another process to perform useful work. Concurrently, the hypervisor 201 proceeds to fulfill the earlier high-latency emulation request. The description in this patent is made in terms of "processes" being scheduled, de-scheduled, etc. However, a person of skill in the art will understand that the invention may also apply with respect to "threads," "tasks," "jobs," "contexts," "schedulable entities" and other, similar terminology that may be used. Accordingly, the term process should generally be interpreted broadly herein as any entity that may be "scheduled," as that term is used herein, by an OS or other system-level software.

When the hypervisor is done performing the high-latency operation, it issues a virtual interrupt to the guest device 205, e.g., by using an IRQ number pre-determined when the device 205 was registered with the guest at boot time. In response to the interrupt, the driver 207 "completes" the read call and returns control to the calling process 260. This causes the blocked guest process 260 to awaken and resume execution.

As an optimization, the first upcall can open/read the virtual device 205, and leave the device 205 open. This way, subsequent upcalls can simply read without re-opening the device 205. In this scenario, the file descriptor for the virtual device 205 is closed automatically on process exit. In another embodiment, a semaphore based methodology is implemented instead of the use of a blocking operation. Semaphore based methodology is described in greater detail in conjunction with FIG. 4 below. In one embodiment, the driver 207 causes a process 260 to be de-scheduled by lowering its scheduling priority within the guest OS 220. Similarly, the driver 207 can cause the raising of the scheduling priority of a process 260 to reduce the latency of having the guest OS 220 re-schedule it (i.e., reduce the time between marking it runnable and having the guest OS scheduler actually select it for execution).

Figure 1:
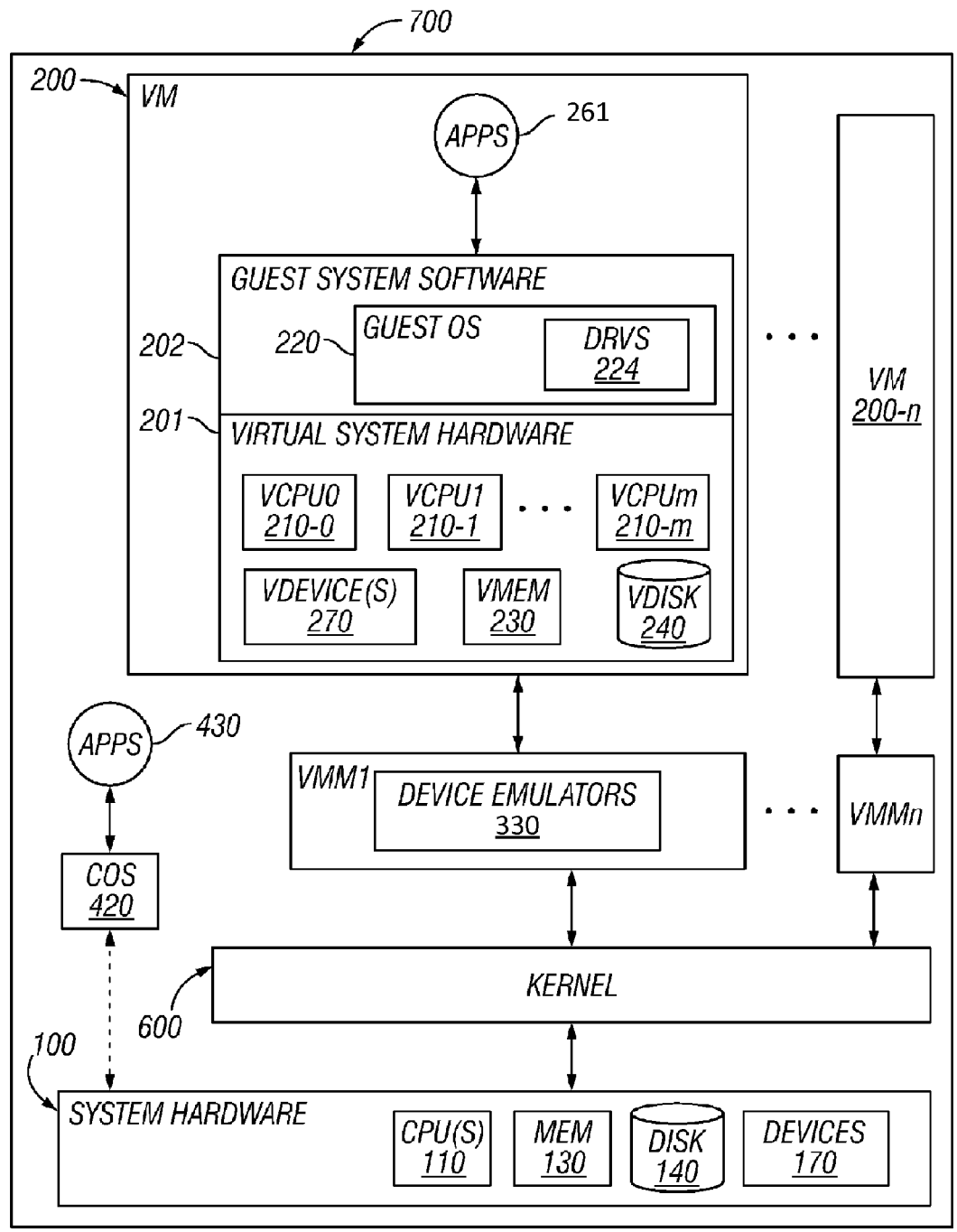
FIG. 1 is a block diagram illustrating an example of prior art virtualization technology.
Figure 3:
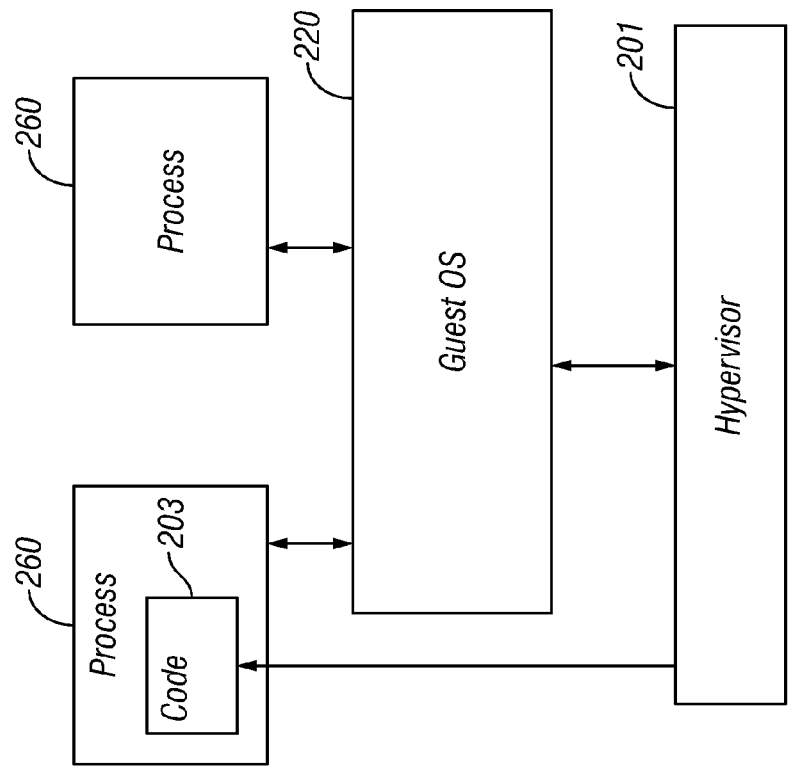
FIG. 3 is a block diagram illustrating managing latency introduced by virtualization, according to other embodiments of the present invention.

Turning now to FIG. 3, other embodiments are illustrated which do not utilize a special device 205. As with the embodiments illustrated in FIG. 2, when the currently scheduled guest process 260 triggers a long-latency emulation activity in the hypervisor 201, the hypervisor 201 performs an upcall into the guest process 260. However, as illustrated in FIG. 3, in this embodiment the upcall simply executes code 203 that performs a sleep operation for a specified period of time (e.g., by invoking the nanosleep( ) system call under Linux), and then returns to the caller. The currently scheduled guest process 260 going to sleep causes the guest OS 220 to de-schedule that process 260 and schedule another one until the specified amount of time has elapsed. At that point, the guest OS 220 wakes up the sleeping process 260, which upon wakeup re-executes the instruction that caused the earlier long-latency virtualization operation. If the hypervisor 201 has not yet completed that operation, it will again utilize the upcall to put the process 260 back to sleep. The same sequence repeats until, after a wakeup of the guest process 260, the virtualization operation has completed. During each iteration, the guest OS 220 schedules something other than the sleeping process 260, and thus useful work can be performed at a guest level while the hypervisor 201 is executing the long-latency virtualization operation. In another embodiment, rather than waking up the sleeping process 260, the hypervisor 201 indicates to the code in the sleep loop that the high-latency operation has completed (e.g., by setting a flag visible to the process, or by changing the code in the upcall code page). Note that in some cases, e.g., where the high-latency operation has side effects, re-execution may not be feasible. In such a case, the code could check the flag and decide whether to continue execution or to sleep for another iteration.

Note that the above-described cycle may be repeated multiple times, depending upon the amount of time selected for which to put the guest process 260 to sleep, and the length of time it takes the hypervisor 201 to complete its task. Additionally, the process 260 may remain asleep for a period of time after the hypervisor's 201 virtualization operation has been completed, depending upon how closely matched the sleep time is to the amount of time it takes the hypervisor to complete its work. In some embodiments, a default period of time is used, in which case the specific default value to use is a variable design parameter. In some embodiments, the hypervisor 201 can issue the sleep command with a parameter based on its estimate of the length of time it needs to execute its virtualization operation. The more accurate the estimate is, the lower the computational cost of the associated polling operations. Note also that the cost of repeated polling may be reduced if the guest OS 220 is under a heavy CPU load, since under those circumstances the process 260 is likely to remain on the guest run queue for a period of time after being awakened.

The approach described in conjunction with FIG. 2 allows the hypervisor 201 to express a guest process 260 dependency quite explicitly, using a virtual device 205 and interrupt-based notifications. This works well, for example, when the delay is expected to be long or unpredictable. A negative side of this interrupt based scenario is that it is a bit heavyweight: a virtual device 205 is installed in the guest OS 220, and the full virtual interrupt path needs to be executed before the blocked guest process 260 is reactivated. The execution of the interrupt path itself can be computationally expensive. In contrast, the scenario described in conjunction with FIG. 3 does not express an explicit dependency, but instead uses a polling-based technique. This polling method approach does not have the overhead associated with the use of a virtual device 205 and interrupts. However, it does not offer the same level of time control as the interrupt based approach, so it can be appropriate, for example, where the delay is short or predictable. These two approaches can both be useful under different circumstances.

Figure 4:
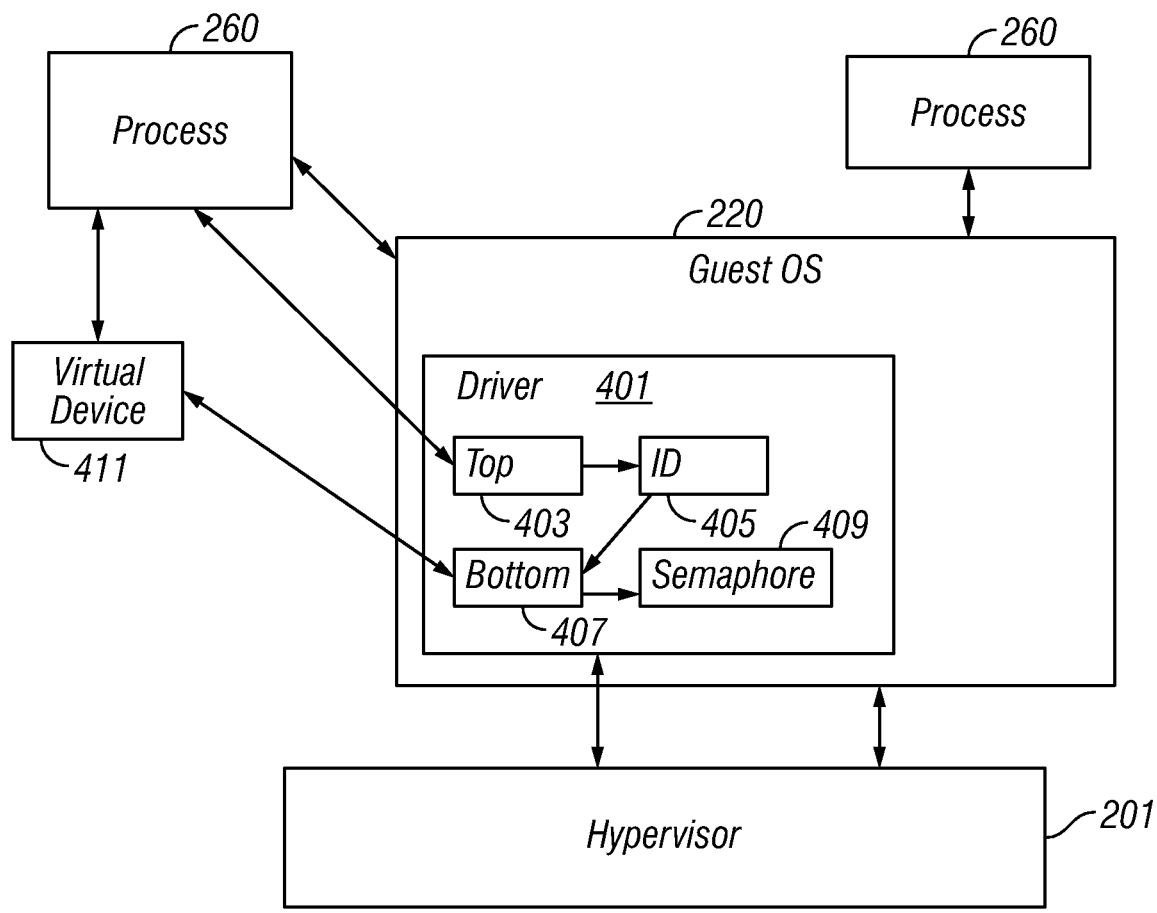
FIG. 4 is a block diagram illustrating managing latency introduced by virtualization, according to yet other embodiments of the present invention.

FIG. 4 illustrates other embodiments. As illustrated in FIG. 4, the hypervisor 201 can install a generic driver 401 in the guest OS 220, with two IRQs. When the currently active guest process 260 initiates a high latency operation, the hypervisor 201 issues the first IRQ to the guest, which is intercepted by the driver 401. As will be understood by those of ordinary skill in the relevant art, the IRQ handler in the guest executes in the context of the guest process 260 that was currently active at the time of interrupt. In other words, as per standard interrupt handling, under these circumstances there is no rescheduling event along the IRQ delivery path. As is known by those of ordinary skill in the relevant art, a "top half" 403 of the generic driver 401 executes in the context of the interrupted guest process 260, and saves the identifier (ID) 405 of that process 260, before turning execution control over to the guest OS 220, which executes a "bottom half" 407 of the driver 401 in (guest) OS space before returning control to the interrupted process 260.

The bottom half 407 takes an action which causes the guest OS 220 to de-schedule the interrupted process 260. In one embodiment, the bottom half 407 changes the state of the guest process 260 from being runnable to waiting on a semaphore 409, where the semaphore 409 is a global variable in the driver 401. In another embodiment, the bottom half creates an explicit dependency between the guest process 260 and a virtual device 411 associated with the driver 401, by causing a blocking operation to be executed in the process's 260 space, as described above in conjunction with FIG. 2. Either way, it is to be understood that the bottom half 407 knows the identity of the guest process 260 even though it is not executing in its context, because the top half 403 stored the process ID 405. In both the semaphore 409 based and blocking scenarios, the operation of the bottom half 407 of the driver 401 causes the guest OS 220 to de-schedule the interrupted process 260, and schedule something else to do useful work. It is to be understood that a semaphore 409 is but one example of a data structure that can be used for synchronization.

When the hypervisor 201 later completes its operation, it issues another IRQ, and the IRQ handler (or the bottom half 407) takes appropriate action to reactivate the relevant guest process 260. In the semaphore 409 based approach, the semaphore 409 is effectively signaled, which wakes up the stalled process 260. In the blocking embodiments, the explicit dependency between the blocked process 260 and the virtual device 411 is ended, causing the guest OS 220 to reschedule the process 260.

In one embodiment, the two IRQ schemes are optimized into a single IRQ, with a status register in the virtual device 401. In another embodiment, a sleep for a while semantic is used instead of a purely IRQ based approach, which wakes up the stalled process 260 after a given short amount of time. It is to be further understood that the "top half, bottom half" device architecture is specific to Linux and Windows like operating systems. Under other operating system architectures, similar methodologies could be utilized to provide the same blocking and or semaphore 409 based functionalities before returning control from the driver 401 to the interrupted process 260, such that guest OS 220 schedules another process 260.

The above described embodiments are fairly general, and can be used by the hypervisor 201 to stall the execution of any arbitrary process 260 in the guest OS. As will be understood by those of ordinary skill in the relevant art, the hypervisor 201 could cause execution problems in the guest if it stopped a process 260 at certain sensitive phases. For example, interrupting a kernel thread can cause negative complications. In general, the above described embodiments are suitable for stalling any user-mode process 260 (i.e., a guest OS 220 is free to preempt a user-mode process 260 at any point). However, according to the various embodiments, the hypervisor 201 typically does not make upcalls into guest kernel-mode code, as the kernel may be holding spinlocks or executing some non-interruptible critical section. Where the hypervisor 201 does make upcalls into guest kernel-mode code, it uses special processing techniques, known to those of ordinary skill in the art of operating system internals and interrupt handling, to take into account such challenges.

It is to be understood that the above description uses the term "hypervisor" 201 throughout, but as noted above, the terms hypervisor 201 can be used quasi-interchangeably with other terms such as VMM, and the use of any such virtualization component is within the scope of the present invention. Furthermore, various embodiments of the present invention can be implemented under the various virtualization scenarios discussed in the background section above. It is to be noted that embodiments of the present invention can be very useful in the content of multi-core architectures, under which the hypervisor 201 can execute its long latency operation in one core, while the guest OS 220 schedules another process 260 and executes concurrently in another core.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Accordingly, the disclosure of the present invention is intended to be illustrative, but not limiting, of the scope of the invention, which is set forth in the following claims.

What is claimed is:

1. A method, implemented in a computer having virtualization logic for supporting a virtual machine, for managing latency introduced by virtualization, the method comprising the steps of:

the virtualization logic determining that a currently scheduled guest process has executed functionality responsive to which the virtualization logic is to execute a virtualization based operation, the virtualization based operation not being visible to a guest operating system;

the virtualization logic causing the guest operating system to temporarily de-schedule the currently scheduled guest process and schedule at least one separate guest process that is different from the de-scheduled guest process;

the virtualization logic executing the virtualization based operation concurrently with the execution of the at least one separate guest process;

the virtualization logic, responsive to completing the execution of the virtualization based operation, causing the guest operating system to re-schedule the de-scheduled guest process.

2. The method of claim 1 wherein causing the guest operating system to de-schedule the currently scheduled guest process and schedule at least one separate guest process further comprises:

injecting code into the currently scheduled guest process, such that when the injected code is executed, the guest operating system is caused to de-schedule the currently scheduled guest process.

3. The method of claim 2 further comprising:
using an upcall to transfer control to the injected code.

4. The method of claim 2 wherein injecting code into the currently scheduled guest process further comprises:

registering at least one memory page that the virtualization logic can use for performing an upcall.

5. The method of claim 2 wherein injecting code into the currently scheduled guest process further comprises:

the virtualization logic modifying at least one existing guest memory page.

6. The method of claim 1 further comprising:
causing the guest operating system to load a device driver for a virtual device.

7. The method of claim 6 wherein causing the guest operating system to de-schedule the currently scheduled guest process and schedule at least one separate guest process further comprises:

injecting code into the currently scheduled guest process, such that when the code is executed the currently scheduled guest process executes a system call to invoke a driver associated with the virtual device; and the driver performing an operation that causes the guest operating system to de-schedule the currently scheduled guest process and schedule at least one separate guest process.

8. The method of claim 6 wherein causing the guest operating system to de-schedule the currently scheduled guest process and schedule at least one separate guest process further comprises:

the virtualization logic posting a virtual interrupt to the virtual device; and in response to the virtual interrupt, a driver associated with the virtual device performing an operation that causes the guest operating system to de-schedule the currently scheduled guest process and schedule at least one separate guest process.

9. The method of claim 8 further comprising:
in response to the virtual interrupt, a portion of the driver executing in context of the currently scheduled process, and saving a corresponding process identifier; and
a portion of the driver using the process identifier to perform an operation to cause the guest operating system to de-schedule the currently scheduled guest process and schedule at least one separate guest process.

10. The method of claim 6 wherein causing the guest operating system to de-schedule the currently scheduled guest process and schedule at least one separate guest process further comprises:
a driver associated with the virtual device performing an operation that causes the guest operating system to de-schedule the currently scheduled guest process and schedule at least one separate guest process.

11. The method of claim 10 wherein the driver performing an operation that causes the guest operating system to de-schedule the currently scheduled guest process and schedule at least one separate guest process further comprises:
the driver causing the currently scheduled guest process to block on the virtual device.

12. The method of claim 11 wherein causing the guest operating system to re-schedule the de-scheduled guest process further comprises:
the virtualization logic posting a virtual interrupt to the virtual device; and
in response to the virtual interrupt, the driver completing the blocking operating on the virtual device, such that the de-scheduled process no longer blocks on the virtual device.

13. The method of claim 10 wherein the driver performing an operation that causes the guest operating system to de-schedule the currently scheduled guest process and schedule at least one separate guest process further comprises:
the driver changing the status of the currently scheduled guest process from runnable to waiting on a data structure used for synchronization.

14. The method of claim 13 wherein causing the guest operating system to re-schedule the de-scheduled guest process further comprises:
the virtualization logic posting a virtual interrupt to the virtual device; and
in response to the virtual interrupt, the driver effectively signaling the data structure used for synchronization, such that the status of the de-scheduled guest process is changed from waiting on the data structure used for synchronization to runnable.

15. The method of claim 13 wherein the data structure used for synchronization further comprises:
a semaphore.

16. The method of claim 10 wherein the driver associated with the virtual device performing an operation that causes the guest operating system to de-schedule the currently scheduled guest process and schedule at least one separate guest process further comprises:
lowering a scheduling priority of the process to de-schedule.

17. The method of claim 16 further comprising:
raising a scheduling priority of the process to re-schedule.

18. The method of claim 1 wherein causing the guest operating system to de-schedule the currently scheduled guest process and schedule at least one separate guest process further comprises:
injecting code into the currently scheduled guest process, such that when the code is executed the currently scheduled guest process sleeps for a specified period of time; and
the sleeping process waking after the specified period of time, and re-executing the instruction that caused the virtualization logic to determine that a currently scheduled guest process has executed functionality responsive to which the virtualization logic is to execute the virtualization based operation.

19. The method of claim 18 further comprising:
the virtualization logic determining that it has not completed the virtualization based operation; and
responsive to the determination, the virtualization logic again causing the currently scheduled guest process to sleep for a specified period of time.

20. At least one non-transitory computer readable medium containing a computer program product for managing latency introduced by virtualization, the computer program product being executable in a computer having virtualization logic for supporting a virtual machine, the computer program product comprising:
program code for determining that a currently scheduled guest process has executed functionality responsive to which the virtualization logic is to execute a virtualization based operation, the virtualization based operation not being visible to a guest operating system;
program code for causing the guest operating system to temporarily de-schedule the currently scheduled guest process and schedule at least one separate guest process that is different from the de-scheduled guest process;
program code for executing the virtualization based operation concurrently with the execution of the at least one separate guest process; and
program code for, responsive to completing the execution of the virtualization based operation, causing the guest operating system to re-schedule the de-scheduled guest process.

21. The computer program product of claim 20 wherein the program code for causing the guest operating system to de-schedule the currently scheduled guest process and schedule at least one separate guest process further comprises:
program code for injecting code into the currently scheduled guest process, such that when the injected code is executed, the guest operating system is caused to de-schedule the currently scheduled guest process.

22. The computer program product of claim 21 further comprising:
program code for using an upcall to transfer control to the injected code.

23. The computer program product of claim 20 further comprising:
program code for causing the guest operating system to load a device driver for a virtual device.

24. The computer program product of claim 23 wherein the program code for causing the guest operating system to de-schedule the currently scheduled guest process and schedule at least one separate guest process further comprises:
program code for injecting code into the currently scheduled guest process, such that when the code is executed the currently scheduled guest process executes a system call to invoke a driver associated with the virtual device; and program code for the driver performing an operation that causes the guest operating system to de-schedule the currently scheduled guest process and schedule at least one separate guest process.

25. The computer program product of claim 23 wherein the program code for causing the guest operating system to de-schedule the currently scheduled guest process and schedule at least one separate guest process further comprises:
program code for posting a virtual interrupt to the virtual device; and
program code for, in response to the virtual interrupt, a driver associated with the virtual device performing an operation that causes the guest operating system to de-schedule the currently scheduled guest process and schedule at least one separate guest process.

26. The computer program product of claim 25 further comprising:
program code for, in response to the virtual interrupt, a portion of the driver executing in context of the currently scheduled process, and saving a corresponding process identifier; and
program code for a portion of the driver using the process identifier to perform an operation to cause the guest operating system to de-schedule the currently scheduled guest process and schedule at least one separate guest process.

27. The computer program product of claim 23 wherein the program code for causing the guest operating system to de-schedule the currently scheduled guest process and schedule at least one separate guest process further comprises:
program code for a driver associated with the virtual device performing an operation that causes the guest operating system to de-schedule the currently scheduled guest process and schedule at least one separate guest process.

28. The computer program product of claim 27 wherein the program code for the driver performing an operation that causes the guest operating system to de-schedule the currently scheduled guest process and schedule at least one separate guest process further comprises:
program code for the driver causing blocking of the currently scheduled guest process to block on the virtual device.

29. The computer program product of claim 28 wherein the program code for causing the guest operating system to re-schedule the de-scheduled guest process further comprises:
program code for posting a virtual interrupt to the virtual device; and
program code for, in response to the virtual interrupt, the driver completing the blocking operating on the virtual device, such that the de-scheduled process no longer blocks on the virtual device.

30. The computer program product of claim 27 wherein the program code for the driver performing an operation that causes the guest operating system to de-schedule the currently scheduled guest process and schedule at least one separate guest process further comprises:
program code for the driver changing the status of the currently scheduled guest process from runnable to waiting on a data structure used for synchronization.

31. The computer program product of claim 30 wherein the program code for causing the guest operating system to re-schedule the de-scheduled guest process further comprises:
program code for posting a virtual interrupt to the virtual device; and
program code for, in response to the virtual interrupt, the driver effectively signaling the data structure used for synchronization, such that the status of the de-scheduled guest process is changed from waiting on the data structure used for synchronization to runnable.

32. The computer program product of claim 20 wherein the program code for causing the guest operating system to de-schedule the currently scheduled guest process and schedule at least one separate guest process further comprises:
program code for injecting code into the currently scheduled guest process, such that when the code is executed the currently scheduled guest process sleeps for a specified period of time; and
program code for the sleeping process waking after the specified period of time, and re-executing the instruction that caused the program code to determine that a currently scheduled guest process has executed functionality responsive to which the virtualization logic is to execute the virtualization based operation.

33. The computer program product of claim 32 further comprising:
program code for determining that the virtualization based operation has not completed; and
program code for, responsive to the determination, again causing the currently scheduled guest process to sleep for a specified period of time.

34. A computer system for managing latency introduced by virtualization, the computer system having virtualization logic for supporting a virtual machine, the computer system comprising:
means for determining that a currently scheduled guest process has executed functionality responsive to which the virtualization logic is to execute a virtualization based operation, the virtualization based operation not being visible to a guest operating system;
means for causing the guest operating system to temporarily de-schedule the currently scheduled guest process and schedule at least one separate guest process that is different from the de-scheduled guest process;
means for executing the virtualization based operation concurrently with the execution of the at least one separate guest process; and
means for, responsive to completing the execution of the virtualization based operation, causing the guest operating system to re-schedule the de-scheduled guest process.

* * * * *